UNITED STATES PATENT OFFICE.

JOHN A. SHEPHARD, OF WOOSTER, OHIO.

PAINT.

SPECIFICATION forming part of Reissued Letters Patent No. 10,528, dated September 30, 1884.

Original No. 303,330, dated August 12, 1884. Application for Reissue filed September 5, 1884.

*To all whom it may concern:*

Be it known that I, JOHN A. SHEPHARD, of Wooster, county of Wayne, and State of Ohio, have invented certain new and useful Improvements in Paints, of which the following is a specification.

The aim of my invention is to provide a composition of red lead and oil which will remain in a pasty or semi-liquid condition for an indefinite length of time, so that it may be manufactured economically on a large scale, and placed upon the market as an unchangeable article of merchandise, ready for immediate use by the consumer.

The combinations of red lead and oil hitherto known in the art were of such character that when retained in bulk the lead would speedily separate from the oil and assume a solid condition, by which it was rendered unfit for further use. As a consequence of this fact it has been the custom for the individual consumer to purchase the materials and prepare his composition by hand immediately before using the same. This operation resulted in the expenditure of much time and labor, and in the loss of such material as was not immediately used.

In preparing my composition I proceed as follows: I take red lead, one pound; boiled or raw linseed-oil, half a gill; japan, half a gill; turpentine, half a gill; glycerine, half an ounce. These ingredients are intimately incorporated by grinding them in an ordinary paint-mill, or by any equivalent means which will insure their thorough incorporation. The result of the operation is a composition which, unlike the ordinary compounds, red lead and oil, will remain in a soft or semi-fluid condition for a great length of time, and which will, when applied to an exposed surface in the ordinary manner, dry and harden.

I prefer to use the several ingredients in the proportions above specified; but it is understood that the proportions may be modified to a limited extent.

Having thus described my invention, what I claim is—

1. A composition consisting of red lead and glycerine ground in oil, as specified.

2. A new composition of matter, consisting of red lead, glycerine, linseed-oil, japan, and turpentine in its proportion, substantially as specified.

3. As a new article of manufacture, red lead ground in oil and possessing the quality of permanent softness.

In witness whereof I hereunto set my hand.

JOHN A. SHEPHARD.

Witnesses:
G. W. BALLOCH,
EDWARD C. MILLER.